United States Patent
Sinha

(10) Patent No.: US 8,437,128 B1
(45) Date of Patent: May 7, 2013

(54) MULTIPURPOSE COMPUTER ACCESSORY

(76) Inventor: Manoj Sinha, Columbus, OH (US)

( * ) Notice: Subject to any disclaimer, the term of this patent is extended or adjusted under 35 U.S.C. 154(b) by 327 days.

(21) Appl. No.: 12/970,820

(22) Filed: Dec. 16, 2010

Related U.S. Application Data

(63) Continuation-in-part of application No. 12/795,550, filed on Jun. 7, 2010, now Pat. No. 8,000,098.

(51) Int. Cl.
*H05K 5/00* (2006.01)
*H05K 7/00* (2006.01)

(52) U.S. Cl.
USPC ............. 361/679.41; 361/679.55; 361/679.56

(58) Field of Classification Search ............. 361/679.41, 361/679.55, 679.56
See application file for complete search history.

(56) References Cited

U.S. PATENT DOCUMENTS

| | | | |
|---|---|---|---|
| 5,604,663 A * | 2/1997 | Shin et al. | 361/679.43 |
| 6,043,976 A * | 3/2000 | Su | 361/679.41 |
| 6,359,994 B1 * | 3/2002 | Markow et al. | 381/333 |
| 7,502,225 B2 * | 3/2009 | Solomon et al. | 361/679.41 |
| 2005/0162824 A1* | 7/2005 | Thompson | 361/686 |
| 2006/0061958 A1* | 3/2006 | Solomon et al. | 361/686 |
| 2009/0154079 A1* | 6/2009 | Bae | 361/679.02 |
| 2010/0169531 A1* | 7/2010 | Bae | 710/303 |

* cited by examiner

*Primary Examiner* — Anthony Haughton
(74) *Attorney, Agent, or Firm* — Fraser Clemens Martin & Miller LLC; Jacob M. Ward

(57) ABSTRACT

A multipurpose computer accessory having a flat base, an under-cushion, and means for connecting any one or more of a keyboard, mouse, touchpad, scroll ball, camera, loudspeaker, USB port, portable device docking station component, video display, or hard drive to an external device such as a laptop or desktop computer.

10 Claims, 4 Drawing Sheets

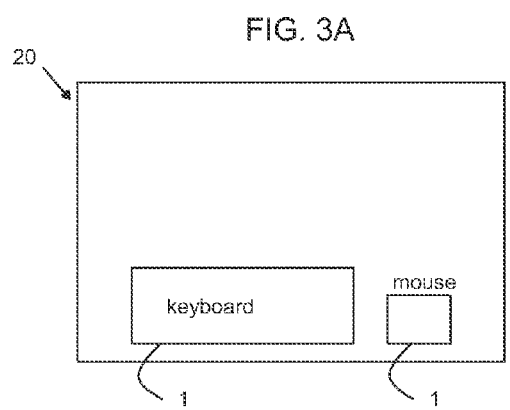
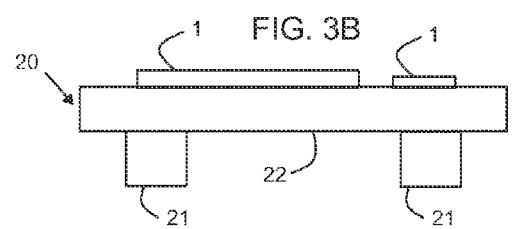
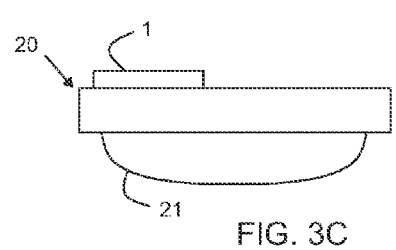
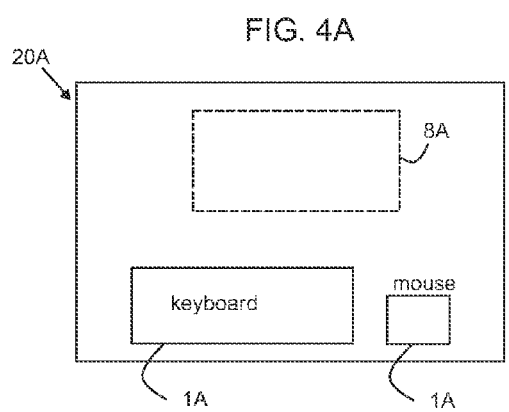
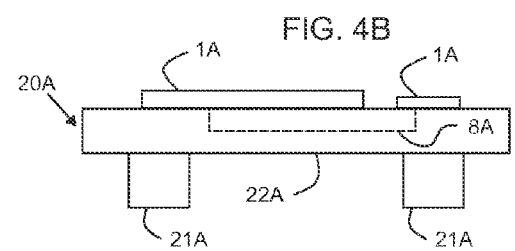
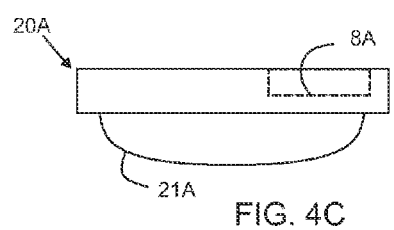

MULTIPURPOSE COMPUTER ACCESSORY

CLAIM OF PRIORITY BASED ON COPENDING APPLICATION

Claims benefit of non-provisional application Ser. No. 12/795,550

The present application is a continuation in part of the patent application Ser. No. 12/795,550 of Manoj Sinha filed Jun. 7, 2010 now U.S. Pat. No. 8,000,098, entitled "Multifaceted Laptop Accessory", and based on which priority is herewith claimed under 35 U.S.C. 120 and the disclosure of which is incorporated herein by reference in its entirety as if fully rewritten herein.

CROSS REFERENCE TO RELATED APPLICATIONS

Ser. No. 12/795,550

FEDERALLY SPONSORED RESEARCH

Not Applicable

SEQUENCE LISTING, TABLE, OR COMPUTER PROGRAM COMPACT DISK APPENDIX

Not Applicable

BACKGROUND AND SUMMARY

The present invention relates generally to laptop computer accessories and specifically to accessories that remotely interact with laptop or desktop computers. The present invention provides the advantageous benefits of a flat base (a.k.a. "pad", or "lapdesk") upon which a variety of accessories may be attached that remotely interact with a laptop or desktop computer.

In one embodiment, a Bluetooth enabled device plugs into a USB port of a computer. The Bluetooth enabled device wirelessly communicates with one or more peripheral components (e.g. video display, keyboard, and mouse) that are attached or set upon the flat base. The user may then interact with the computer as if he or she were sitting in front of it while not actually being in front of it.

A plurality of peripheral components (a.k.a. local peripheral component) may be incorporated such as keyboard, mouse, touchpad, scroll ball, camera, loudspeaker, USB port, portable device docking station component, video display (a.k.a. monitor) or hard drive. In one embodiment, each peripheral component has its own dedicated circuitry to allow independent operation. In another embodiment, all peripheral components interface with the remote computer via a central processor.

BRIEF DESCRIPTION OF THE DRAWINGS

FIG. 3A depicts a top view of flat base base having a keyboard and mouse as peripheral components FIG. 3B depicts a front view of the embodiment of FIG. 3A.

FIG. 3C depicts a side view of the embodiment of FIG. 3A.

FIG. 4A depicts a top view of flat base base having a keyboard and mouse as peripheral components with a central processor component FIG. 4B depicts a front view of the embodiment of FIG. 4A.

FIG. 4C depicts a side view of the embodiment of FIG. 4A.

DETAILED DESCRIPTION

Figure 1:
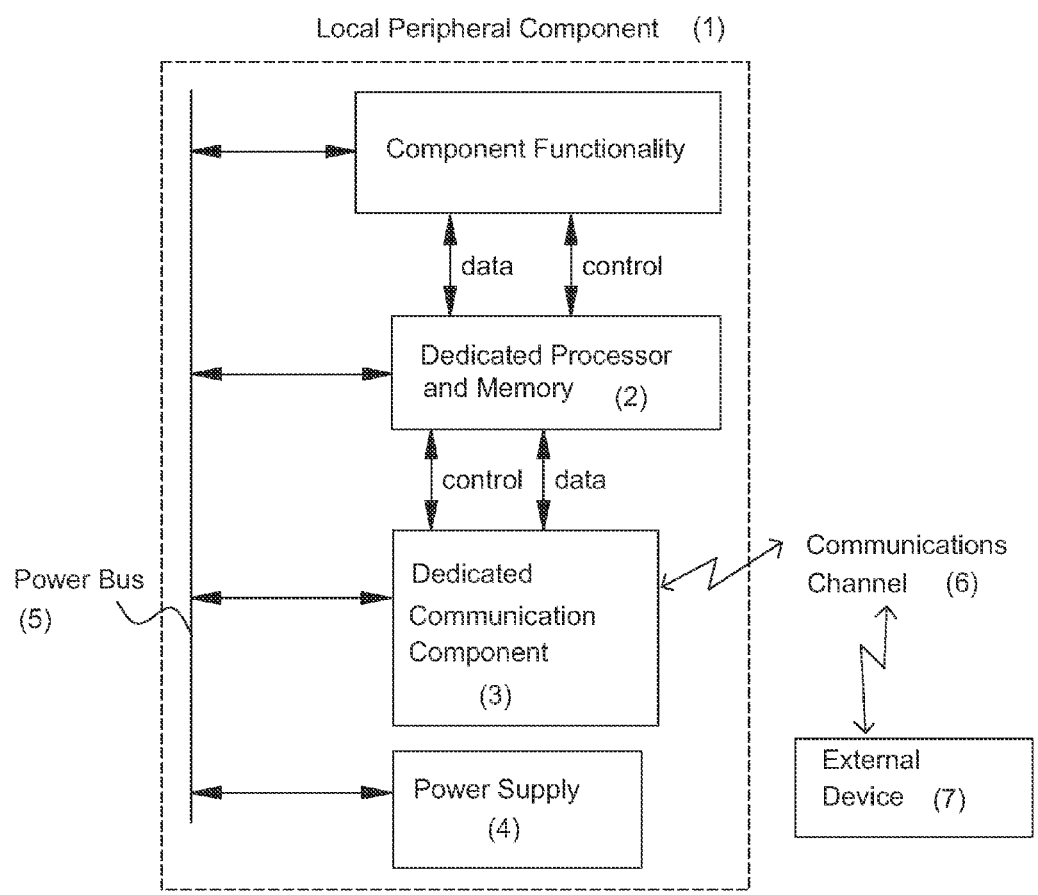
FIG. 1 depicts a block diagram of one embodiment of the invention with dedicated processor for each peripheral component
Figure 2:
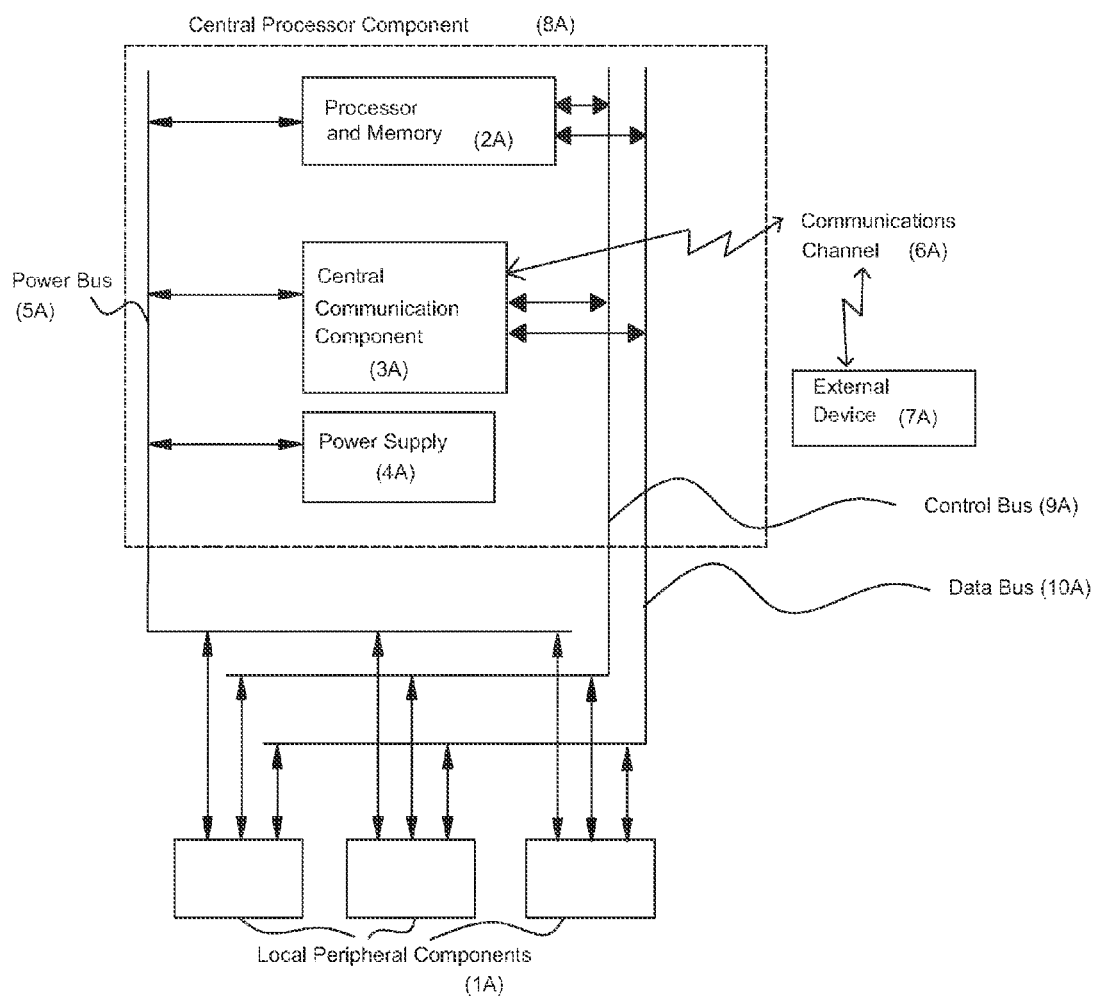
FIG. 2 depicts a block diagram of one embodiment of the invention with central processor

In one embodiment (FIGS. 1, 3A-3C), a multipurpose computer accessory comprises flat base 20, under-cushion 21, local peripheral component(s) 1, communication channel 6, and external device 7. Each local peripheral component 1 includes dedicated communication component 3, power supply 4, power bus 5, and dedicated computer processor and memory 2 sufficient to perform the step of exchanging information with external device 7 via dedicated communication component 3 and communication channel 6 whereby each local peripheral component 1 can operatively communicate with external device 7. It is to be understood that the term "information" as used herein throughout includes (non-exclusively) data and control information. It is to be understood that the terms "communication channel" and "communications channel" as used herein throughout include (non-exclusively) wired and wireless (e.g. cellular, wifi, Bluetooth, infrared) channels.

In one embodiment (FIGS. 2, 4A-4C), a multipurpose computer accessory comprises flat base 20A, under-cushion 21A, central processor component 8A, local peripheral component(s) 1A, communication channel 6A, and external device 7A.

Central processor component 8A comprises central communication component 3A, central power supply 4A, and processor and memory 2A sufficient to perform the steps of exchanging data with local peripheral component 1A via local data bus 10A; exchanging control information with local peripheral component 1A via local control bus 9A; exchanging information with external device 7A via central communication component 3A and communication channel 6A; whereby local peripheral component 1A and central processor component 8A can operatively communicate with external device 7A.

Each local peripheral component 1A is adapted to exchange data with central processor component 8A via local data bus 10A, and also to exchange control information with central processor component 8A via local control bus 9A.

In the various embodiments, each flat base 20, 20A, is rigid and planar having structure sufficient to allow it to function as a lap-based computer accessory wherein the user simply places it on their lap and uses local peripheral component(s) 1, 1A in conjunction with external device 7, 7A.

In the various embodiments, under-cushion 21, 21A is attached to underside 22, 22A of the flat base 20, 20A. It is to be understood that the spirit of the invention is to provide a cushion on the underside of the flat base to allow it to be comfortably placed on the lap of a user. Accordingly, under-cushion 21, 21A can comprise either a unitary cushion attached to underside 22 (22A) of flat base 20 (20A) or alternatively first and second halves (e.g. FIGS. 3B, 4B) attached to underside 22 (22A) of flat base 20 (20A).

In two embodiments, external device 7 & 7A each comprise a Bluetooth enabled device plugged into a USB port of a laptop or desktop computer which includes computer software necessary to interact with the invention.

In the various embodiments, local peripheral components 1, 1A comprise one or more of keyboard, mouse, touchpad, scroll ball, camera, loudspeaker, USB port, portable device docking station component, video display, or hard drive, along with necessary component functionality specific to the type of component (e.g. video display, keyboard, mouse, touchpad, scroll ball, camera, loudspeaker, USB port, portable device docking station component, video display, or hard drive). The portable device docking station component includes (non-exclusively) an ipod (trademark) docking station.

For example, the functionality of a video display can be achieved by sending and receiving video information to and from a Bluetooth device (i.e. external device 7, 7A) that is connected via USB port to a laptop computer. The Bluetooth device interacts with the laptop computer to send video information to the local peripheral component 1, 1A (i.e. external video display mounted on the flat base).

As another example, FIGS. 3A-C depict a keyboard and mouse as local peripheral components 1 wherein each would have its own dedicated computer processor and memory sufficient to perform the step of exchanging information with external device 7 (a laptop or desktop computer) via dedicated communication component 3 and communication channel 6 (Bluetooth) whereby the keyboard and mouse serve as input devices to the laptop or desktop computer.

As another example, FIGS. 4A-C depict a keyboard and mouse as local peripheral components 1A wherein each is adapted to exchange data with central processor component 8A via local data bus 10A and to exchange control information with the central processor component 8A via local control bus 9A. Central processor component 8A performs the step of exchanging information with external device 7A (a laptop or desktop computer) via central communication component 3A and communication channel 6A (Bluetooth) whereby the keyboard and mouse serve as input devices to the laptop or desktop computer.

Figure 5A:
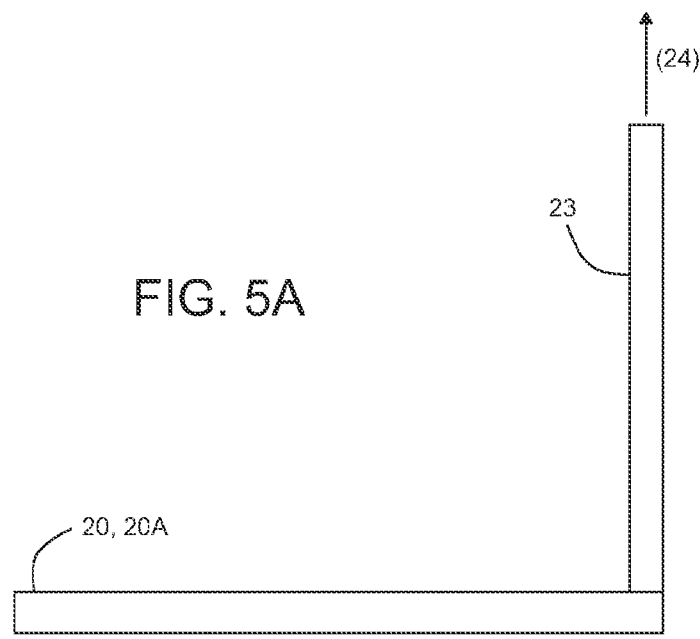
FIG. 5A depicts a side view of flat base with detachable video display

In one embodiment (FIG. 5A), local peripheral components 1 & 1A comprise a video display 23 that is detachable (indicated by directional arrow 24) from flat base 20, 20A and includes a detachable power and signal cable (not shown).

Figure 5B:
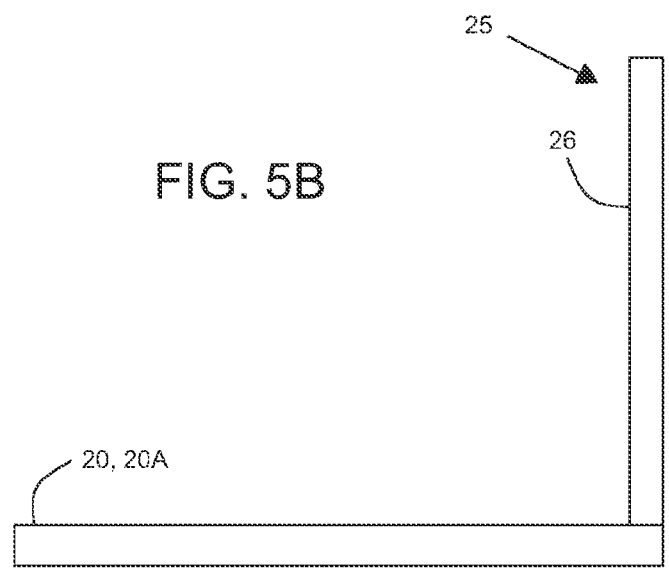
FIG. 5B depicts a side view of flat base with moveable video display (open position)
Figure 5C:
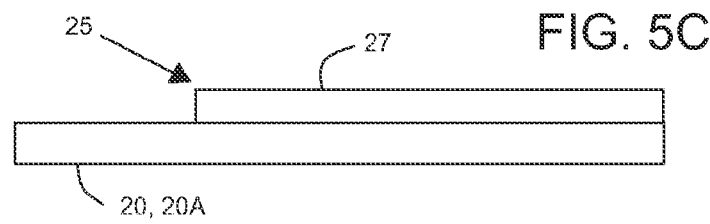
FIG. 5C depicts a side view of flat base with moveable video display (closed position)

In one embodiment, local peripheral components 1 & 1A comprise a video display 25 that is moveable between a first open position 26 (FIG. 5B) and a second closed position 27 (FIG. 5C).

What is claimed is:

1. A multipurpose computer accessory comprising:
   a flat base, being rigid and planar;
   an under-cushion being attached to an underside of the flat base;
   a local peripheral component having
      a power bus,
      a power supply,
      a dedicated communication component,
      a dedicated computer processor and memory sufficient to perform the step of
         exchanging information with an external device via the dedicated communication component and a communication channel whereby the local peripheral component can operatively communicate with the external device.

2. The multipurpose computer accessory of claim 1 wherein
   the external device comprises bluetooth enabled device plugged into a USB port of a laptop or desktop computer.

3. The multipurpose computer accessory of claim 1 wherein the local peripheral component further comprises a detachable video display.

4. The multipurpose computer accessory of claim 1 wherein the local peripheral component further comprises a video display being moveable between a first open position and a second closed position.

5. The multipurpose computer accessory of claim 1 wherein the local peripheral component further comprises one or more of a keyboard, mouse, touchpad, scroll ball, camera, loudspeaker, USB port, portable device docking station component, video display, or hard drive.

6. A multipurpose computer accessory comprising:
   a flat base, being rigid and planar;
   an under-cushion being attached to an underside of the flat base;
   a central processor component having
      a central communication component,
      a power supply,
      computer processor and memory sufficient to perform the steps of
         exchanging data with a local peripheral component via a local data bus,
         exchanging control information with the local peripheral component via a local control bus,
         exchanging information with an external device via the central communication component and a communication channel whereby the local peripheral component and central processor component can operatively communicate with the external device;
   the local peripheral component being adapted to exchange data with the central processor component via the local data bus;
   the local peripheral component being adapted to exchange control information with the central processor component via the local control bus.

7. The multipurpose computer accessory of claim 6 wherein
   the external device comprises bluetooth enabled device plugged into a USB port of a laptop or desktop computer.

8. The multipurpose computer accessory of claim 6 wherein the local peripheral component further comprises a detachable video display.

9. The multipurpose computer accessory of claim 6 wherein the local peripheral component further comprises a video display being moveable between a first open position and a second closed position.

10. The multipurpose computer accessory of claim 6 wherein the local peripheral component further comprises one or more of a keyboard, mouse, touchpad, scroll ball, camera, loudspeaker, USB port, portable device docking station component, video display, or hard drive.

* * * * *